G. G. Gabrion.
Bee Hive.
No. 108,997. Patented Nov. 8, 1870.
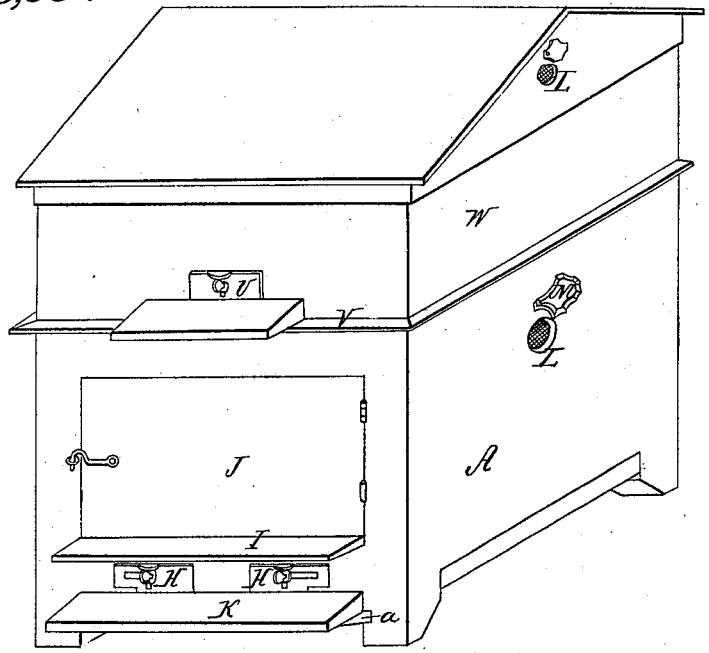
Sectional Views
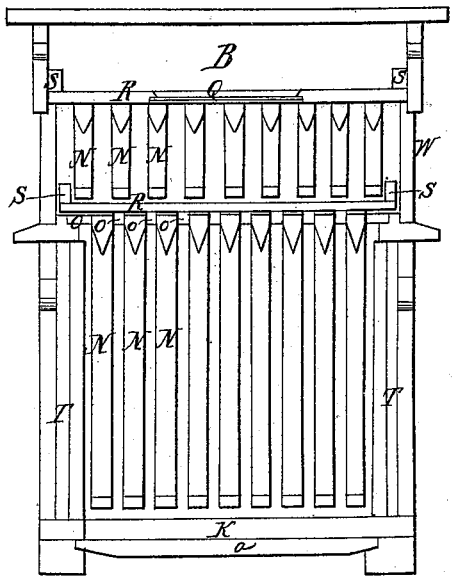
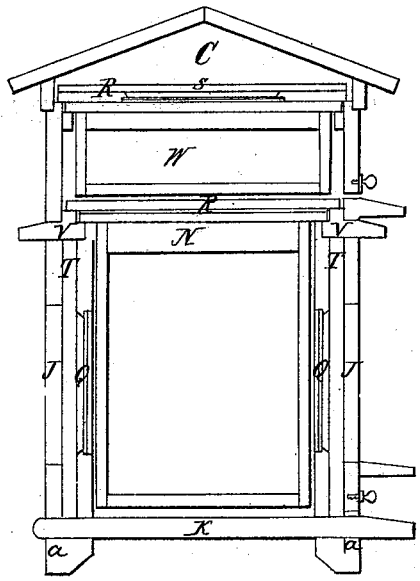
Witnesses:
Isaac Gabrion
Porter K. Run
Inventor:
Gilbert G. Gabrion

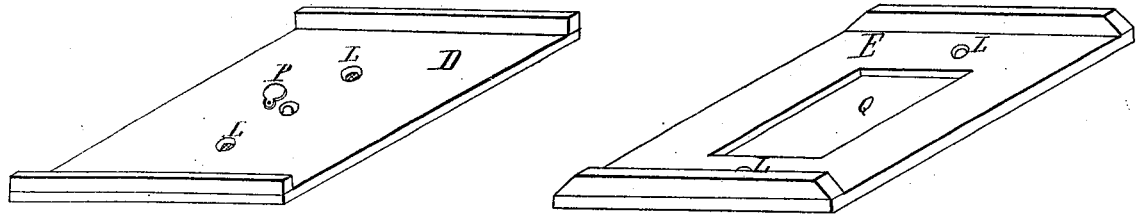
G. G. Gabrion.
Bee Hive.
N° 108,997. Patented Nov. 8, 1870.
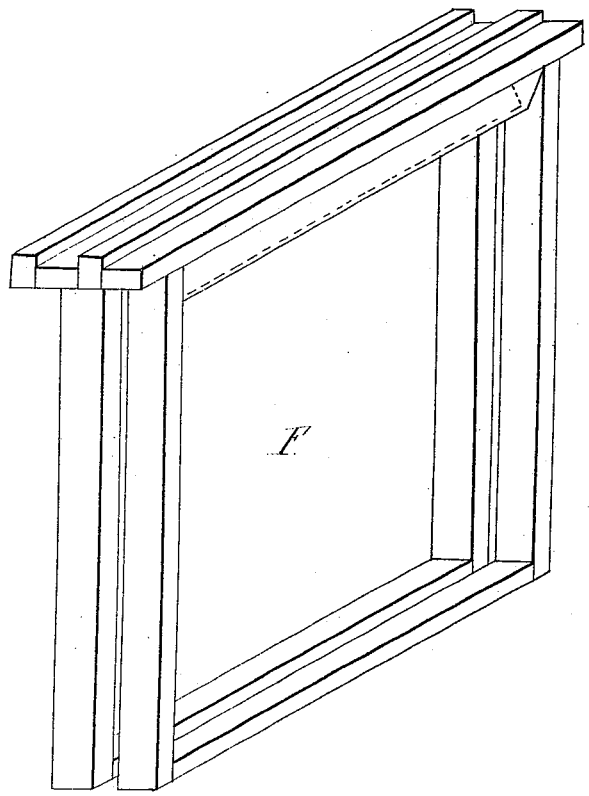
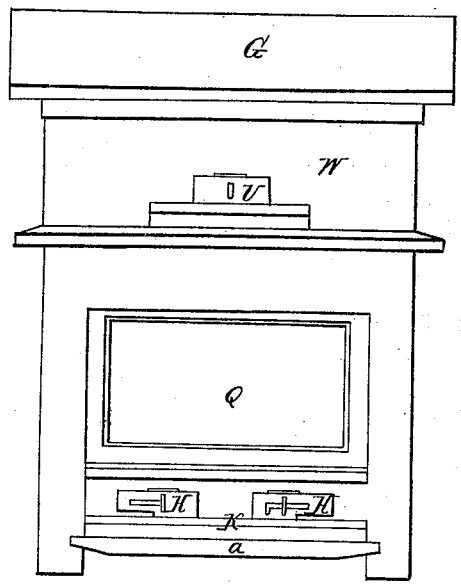
Witnesses:
Isaac Gabrion
Porter K. Run
Inventor:
Gilbert G. Gabrion

United States Patent Office.

GILBERT G. GABRION, OF OLIVE, MICHIGAN.

Letters Patent No. 108,997, dated November 8, 1870; antedated October 28, 1870.

IMPROVEMENT IN BEE-HIVES.

The Schedule referred to in these Letters Patent and making part of tne same.

*To all whom it may concern:*

Be it known that I, GILBERT G. GABRION, of Olive, in the county of Clinton, in the State of Michigan, have invented an Improved Movable-Comb Bee-Hive; and do declare that the following is a full and exact description thereof, reference being had to the accompanying drawings and to letters of reference marked thereon.

The nature of my invention consists in the combination and arrangement of parts, as hereinafter more fully described.

The main hive is surrounded by a dead-air space on all sides, and an adjustable bottom board, with ventilators to the hive through the bottom board, and to the dead-air space from the ends of the hive.

The main hive also has removable comb-racks, kept apart by separators, and is surmounted by a honey-board, with ventilators, and an aperture for the ingress and egress of the bees to the store-room of the hive for surplus honey.

The lower or main hive has two adjustable entrances for bees, and the upper or store-room has one.

This upper room has removable comb-racks and a honey-board, with ventilators and a window.

A cop, in the form of a double roof, rests upon the store-room, having ventilators at each end.

Through doors in the front and rear of the main hive the working of the bees may be observed.

There is a cop over the entrances to the main hive, which serves as a protection in stormy weather.

The adjustment of the bottom board is for convenience in hiving the bees and cleaning out the hive.

The doors in the front and rear of the main hive are for the purpose of observing the progress in storing honey.

The window in the top of the upper or store-room is for the purpose of observing when the bees commence making honey in that portion of the hive where ingress and egress is given at the upper entrance, which enables them to work more rapidly.

To enable others skilled in the art to make and use my invention, I will proceed to describe its construction and operation, referring to the letters upon my diagrams.

A is the bee-hive, closed;

B is a longitudinal section of same, showing comb-frames and air-spaces, as also general construction;

C is a transverse section;

D is an enlarged view of lower honey-board, and E of the upper honey-board;

F is an enlarged view, showing comb-frames and separators;

G is a front view of hive, showing glass front;

H H represent adjustable regulators, which regulate the entrance of the bees, and also prevent the entrance of robbing-bees and other vermin;

I is the cop over the entrance to keep out hail and rain;

J is a door in front of glass sash;

K is a bottom board, which, by removing the supports *a*, can be taken out in hiving bees and cleaning hive;

L are ventilators with gauge-screws;

M are ventilator-covers, to be opened and closed at pleasure;

N are comb-frames; and

O separators, to regulate distances, and to be taken out when the bees get the comb started;

P is a button, to give bees entrance into the store-room or surplus-box;

Q is a glass through which to watch the working of the bees;

R is the honey-board, placed on the top of comb-frames;

S are cleats, to take hold of to remove honey-boards;

T is a dead-air space all around the lower part of the hive;

U is an entrance to upper or store-room for free ingress and egress of bees without going up through lower portion of hive; and V is the rim of the hive, which holds cop in position.

What I claim as my improvement, is—

A bee-hive, provided with adjustable bottom board K, adjustable ventilators L, adjusting regulators H, separators O to the comb-frames, honey-boards D E, dead-air space T, and the upper or store-room M, provided with adjustable entrances and comb-frames, when all the parts are constructed and arranged as and for the purposes herein described.

GILBERT G. GABRION.

Witnesses:
 PORTER K. PERRIN,
 ISAAC GABRION.